(12) United States Patent
Kogirima et al.

(10) Patent No.: US 11,225,300 B2
(45) Date of Patent: Jan. 18, 2022

(54) STRADDLE VEHICLE

(71) Applicant: KAWASAKI JUKOGYO KABUSHIKI KAISHA, Kobe (JP)

(72) Inventors: Masato Kogirima, Kobe (JP); Hiroshi Ishii, Kobe (JP); Kazuhiro Ichikawa, Kobe (JP); Faro Iwamoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 276 days.

(21) Appl. No.: 16/517,864

(22) Filed: Jul. 22, 2019

(65) Prior Publication Data
US 2020/0031421 A1    Jan. 30, 2020

(30) Foreign Application Priority Data

Jul. 30, 2018 (JP) .............................. JP2018-142954

(51) Int. Cl.
| | |
|---|---|
| *B62K 19/34* | (2006.01) |
| *B62K 11/04* | (2006.01) |
| *B62K 19/24* | (2006.01) |
| *B62K 21/00* | (2006.01) |
| *B62K 21/16* | (2006.01) |
| *B62K 19/38* | (2006.01) |
| *B62K 25/04* | (2006.01) |

(52) U.S. Cl.
CPC .............. *B62K 19/34* (2013.01); *B62K 11/04* (2013.01); *B62K 19/24* (2013.01); *B62K 21/005* (2013.01); *B62K 21/16* (2013.01); *B62K 19/38* (2013.01); *B62K 25/04* (2013.01)

(58) Field of Classification Search
CPC ...... B62K 21/005; B62K 21/16; B62K 21/04; B62K 25/04; B62K 19/24; B62K 19/34; B62K 19/38; B62K 11/04; B62K 19/32; B62K 25/24
USPC .................................................. 280/276, 264
See application file for complete search history.

(56) References Cited

U.S. PATENT DOCUMENTS 8,881,858 B2 *  11/2014  Ishii ...................... B62K 25/24
                                                          180/219
9,145,184 B2 *  9/2015   Ishii ...................... B62K 25/16
(Continued)

FOREIGN PATENT DOCUMENTS

| JP | S62031578 A | 2/1987 |
|---|---|---|
| JP | 2014125185 A | 7/2014 |

*Primary Examiner* — Kevin Hurley
*Assistant Examiner* — Hosam Shabara
(74) *Attorney, Agent, or Firm* — Alleman Hall Creasman & Tuttle LLP

(57) ABSTRACT

A straddle vehicle of the present invention includes: a vehicle body frame member; a rotatably supporting member supporting a front wheel; a support arm supporting the rotatably supporting member, the support arm extending rearward from the rotatably supporting member; a pair of upper and lower link members pivotally connected to the support arm at two locations on a rear portion of the support arm at least on one side of the vehicle body in a vehicle width direction, the two locations being spaced in the upward-downward direction, the pair of upper and lower link members extending rearward from the support arm, each of the link members having a rear portion pivotally connected to the vehicle body frame member; a handle; and a handle supporting member removably coupled to the vehicle body frame member and supporting the handle.

9 Claims, 5 Drawing Sheets

(56) References Cited

U.S. PATENT DOCUMENTS 10,427,748 B2 * 10/2019 Ishii .................. B60G 3/207
2014/0183836 A1 7/2014 Ishii et al.
2018/0194427 A1 7/2018 Ishii et al.

* cited by examiner

STRADDLE VEHICLE

CROSS-REFERENCE TO RELATED APPLICATION

This application claims priority to and the benefit of Japanese Patent Application No. 2018-142954, filed on Jul. 30, 2018, the entire disclosure of which is incorporated herein by reference.

BACKGROUND OF THE INVENTION

Field of the Invention

The present invention relates to a front arm-equipped straddle vehicle.

Description of the Related Art

As disclosed, for example, in Japanese Laid-Open Patent Application Publication No. 2014-125185, a front arm-equipped straddle vehicle has a support arm supported at a front of a main frame member supporting an engine, the support arm being swingable in an upward-downward direction. A front wheel is supported by the main frame member via the support arm so as to be movable in the upward-downward direction, and a handle is also supported by the main frame member.

SUMMARY OF THE INVENTION

In manufacturing of straddle vehicles, main frame members need to be prepared depending on the vehicle characteristics such as the maneuverability, riding posture, and vehicle body shape. This makes it difficult to reduce the manufacturing cost.

It is therefore an object of the present invention to provide a front arm-equipped straddle vehicle that allows easy reduction in manufacturing cost.

In order to solve the above problem, a straddle vehicle according to an aspect of the present invention includes: a vehicle body frame member; a front wheel; a rotatably supporting member supporting the front wheel in such a manner that the front wheel is rotatable about a front wheel axis thereof; a support arm supporting the rotatably supporting member in such a manner that the rotatably supporting member is angularly movable about a steering axis extending in an upward-downward direction, the support arm extending rearward from the rotatably supporting member; a pair of upper and lower link members pivotally connected to the support arm at two locations on a rear portion of the support arm, the two locations being spaced in the upward-downward direction, the pair of upper and lower link members extending rearward from the support arm, each of the link members having a rear portion pivotally connected to the vehicle body frame member; a handle to be held by a rider assuming a riding posture; and a handle supporting member removably coupled to the vehicle body frame member and supporting the handle.

With the above configuration, a ground load applied to the front wheel from a ground surface is transmitted as a force acting mainly in the forward-rearward direction to the vehicle body frame member via the support arm and the pair of link members. Thus, the handle supporting member does not need to be rigid enough to resist ground loads. This reduces the influence of restrictions as to the rigidity of the handle supporting member and allows changing the handle supporting member from one type to another depending on the required riding posture on the straddle vehicle or the required vehicle characteristics of the straddle vehicle, making it easy to standardize the rest of the straddle vehicle.

A ground load is transmitted to the vehicle body frame member via the support arm and the pair of link members. At this instant, a compression or tensile force acts on the pair of link members mainly in the axial direction. This can reduce a bending force acting on the pair of link members and thus reduce the influence of structural restrictions imposed for prevention of bending deformation. Thus, the pair of link members can easily be changed from one type to another depending on the required vehicle behaviors, and standardization of the support arm is easy. Accordingly, the number of components common to a plurality of types of vehicles can be increased, and reduction in manufacturing cost can be achieved.

The straddle vehicle may further include a rear wheel and a drive source disposed between the front wheel and the rear wheel and configured to generate a drive power for travel of the vehicle, and the vehicle body frame member may include: a rear wheel supporting portion supporting the rear wheel; a front wheel supporting portion connected to the pair of link members; and a front-rear coupling portion disposed separately from the drive source, the front-rear coupling portion extending in a forward-rearward direction from the front wheel supporting portion and being continuous with the rear wheel supporting portion.

With the above configuration in which the front-rear coupling portion is configured separately from the drive source, transmission to the drive source of a ground load applied from the front wheel can be reduced, and the ground load can be transmitted toward the rear wheel supporting portion. This can reduce the influence of ground loads on the drive source, thus allowing a reduction in rigidity of the drive source. For example, complication of the structure of the drive source or increase in weight of the drive source can be prevented.

The front wheel supporting portion and the front-rear coupling portion may be disposed in a region below a center of the drive source in the upward-downward direction, and in the region below the center of the drive source in the upward-downward direction, the front-rear coupling portion may extend in the forward-rearward direction from the front wheel supporting portion to the rear wheel supporting portion.

With the above configuration, the front-rear coupling portion extends in the forward-rearward direction in the region below the center of the drive source in the upward-downward direction. Thus, the influence exerted on a region above the vehicle body by the vehicle body frame member serving as a rigid member bearing ground loads can be reduced. This can increase the flexibility in designing the straddle vehicle's upper portion which is significantly associated with the vehicle body shape and the riding posture. Additionally, while the upper portion of the straddle vehicle is modifiable, the lower portion of the straddle vehicle can be standardized. Thus, cost in design or manufacturing can be reduced even when a plurality of types of straddle vehicles having different upper portions are manufactured.

The front-rear coupling portion may extend rearward through a region lying between respective rear ends of the paired link members in the upward-downward direction.

With this configuration, a ground load applied to the front-rear coupling portion through the pair of link members can readily be transmitted as an axial load acting in the forward-rearward direction, and the axial load is prevented from being transmitted as a moment to the front-rear coupling portion. This makes it easy to achieve weight reduction of the vehicle body frame member.

The front wheel supporting portion may have a base portion whose dimension in the upward-downward direction decreases from front to rear. In this case, a ground load applied to a longitudinal portion of the front-rear coupling portion through the pair of link members can readily be transmitted as a force acting in the forward-rearward direction, and bending deformation of the front-rear coupling portion can be prevented.

The pair of link members and the front-rear coupling portion may be disposed on each of opposite sides of the vehicle body in a vehicle width direction, the front-rear coupling portions disposed on the opposite sides of the vehicle body in the vehicle width direction may be inclined inwardly in the vehicle width direction in such a manner that a distance between the front-rear coupling portions in the vehicle width direction decreases from front to rear, and the front-rear coupling portions may be coupled in the vehicle width direction at rear portions thereof.

With the above configuration, the shape of the vehicle body frame member in plan view can be trapezoidal, and a ground load applied through the link members can be stably transmitted to the vehicle body frame member from both sides in the vehicle width direction. Deformation of the vehicle body frame member in the vehicle width direction can therefore be prevented.

The front-rear coupling portion may extend in the forward-rearward direction through a region outward of the drive source in the vehicle width direction, the region being inward of an outermost side surface of the drive source in the vehicle width direction. In this case, when the vehicle body is banked during travel, it is possible to prevent the maximum bank angle from being limited by the front-rear coupling portion. In other words, while the vehicle body is banked, the front-rear coupling portion closer to the ground surface can be located inwardly of the drive source in the vehicle width direction. This can improve the maneuverability of the vehicle body during travel.

The support arm may include an arm main portion extending in the forward-rearward direction and a holding portion holding the rotatably supporting member, the holding portion being provided separately from the arm main portion and being removably attached to the arm main portion.

In this case, for example, the arrangement of the steering axis relative to the vehicle body frame member can be varied by preparing a plurality of types of holding portions and by changing the holding portion to be used from one type to another while using the same frame main portion and link members. This makes it possible to vary the amount of offset of the steering axis with respect to the location of the front wheel or vary the caster angle of the front wheel, thus varying the motion characteristics of the vehicle body.

The vehicle body frame member may include a frame main portion and an attachment portion provided separately from the frame main portion and removably attached to the frame main portion, and the pair of link members may be connected to the attachment portion.

In this case, for example, the arrangement of the support arm relative to the vehicle body frame member can be varied by preparing a plurality of types of attachment portions and by changing the attachment portion to be used from one type to another while using the same frame main portion and link members. This makes it possible to vary the vehicle body behavior or the vehicle height by changing the vertical location or the orientation of the front end of the support arm relative to the vehicle body frame member.

A straddle vehicle according to an aspect of the present invention includes: a vehicle body frame member; a front wheel; a rear wheel; a rotatably supporting member supporting the front wheel in such a manner that the front wheel is rotatable about a front wheel axis thereof; a support arm supporting the rotatably supporting member in such a manner that the rotatably supporting member is angularly movable about a steering axis extending in an upward-downward direction, the support arm extending rearward from the rotatably supporting member; a handle to be held by a rider assuming a riding posture; a handle supporting member removably coupled to the vehicle body frame member and supporting the handle; and a drive source disposed between the front wheel and the rear wheel and configured to generate a drive power for travel of the vehicle, wherein the vehicle body frame member includes: a rear wheel supporting portion supporting the rear wheel; a connection portion connected directly or indirectly to the support arm; and a front-rear coupling portion disposed separately from the drive source, the front-rear coupling portion extending in a forward-rearward direction from the connection portion and being continuous with the rear wheel supporting portion, the connection portion and the front-rear coupling portion are disposed in a region below a center of the drive source in the upward-downward direction, and in the region below the center of the drive source in the upward-downward direction, the front-rear coupling portion extends in the forward-rearward direction from the connection portion to the rear wheel supporting portion.

With the above configuration, the influence of restrictions as to the rigidity of the handle supporting member is reduced. This allows changing the handle supporting member from one type to another depending on the required riding posture on the straddle vehicle or the required vehicle characteristics of the straddle vehicle, making it easy to standardize the rest of the straddle vehicle. Additionally, since the front-rear coupling portion is configured separately from the drive source, reduction in rigidity of the drive source is possible. Thus, for example, complication of the structure of the drive source or increase in weight of the drive source can be prevented.

Additionally, since the front-rear coupling portion extends in the forward-rearward direction in the region below the center of the drive source in the upward-downward direction, the influence exerted on a region above the vehicle body by the vehicle body frame member serving as a rigid member bearing ground loads can be reduced. This can increase the flexibility in designing the upper portion of the straddle vehicle. Additionally, since the lower portion of the straddle vehicle can be standardized, cost in design or manufacturing can be reduced even when a plurality of types of straddle vehicles having different upper portions are manufactured.

According to the above aspects of the present invention, there is provided a front arm-equipped straddle vehicle that allows easy reduction in manufacturing cost.

The above and further objects, features and advantages of the present invention will be more apparent from the following detailed description of preferred embodiments with reference to the accompanying drawings.

DETAILED DESCRIPTION OF THE EMBODIMENTS

First Embodiment

[Overall Structure of Motorcycle]

Figure 1:
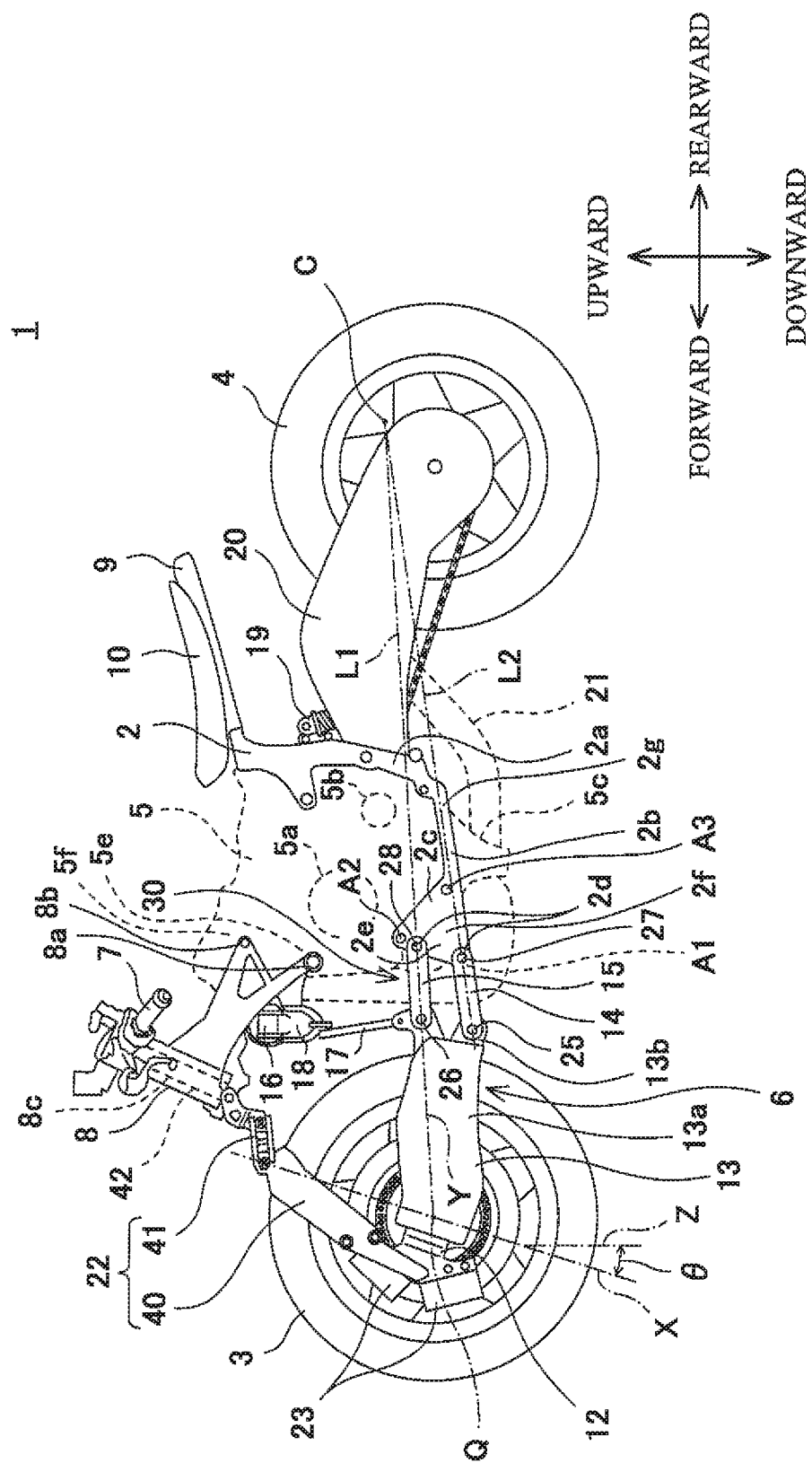
FIG. 1 is a left side view of major components of a motorcycle according to a first embodiment.
Figure 2:
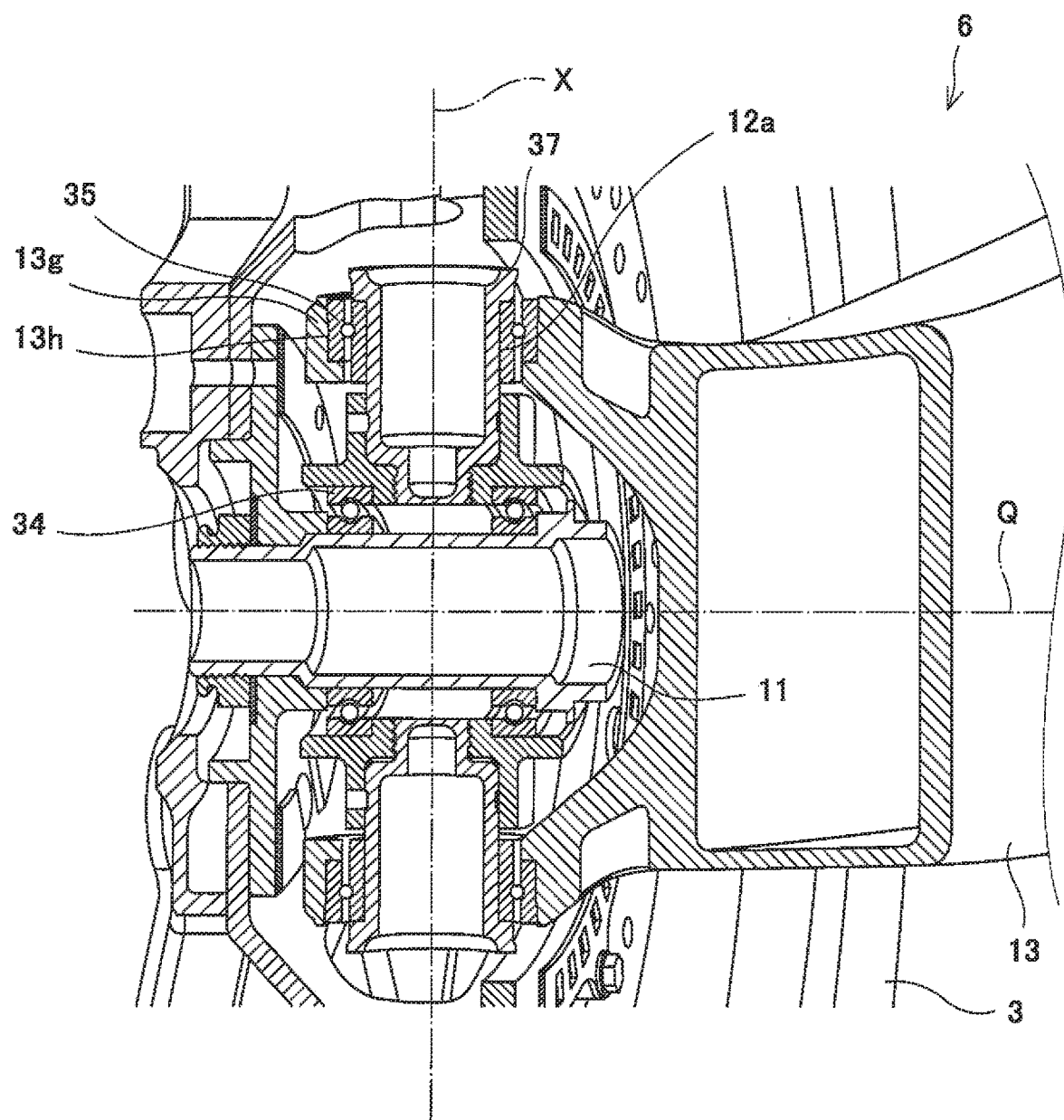
FIG. 2 is a cross-sectional view of a front wheel supporting structure shown in FIG. 1, taken along a plane including a steering axis and a front wheel axis.
Figure 2:
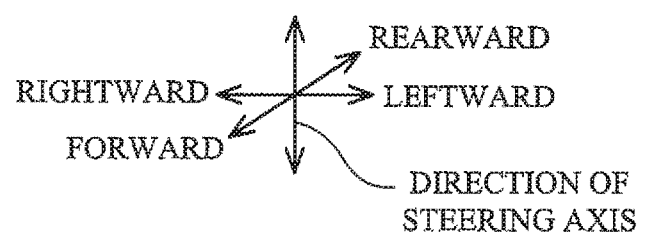
Figure 3:
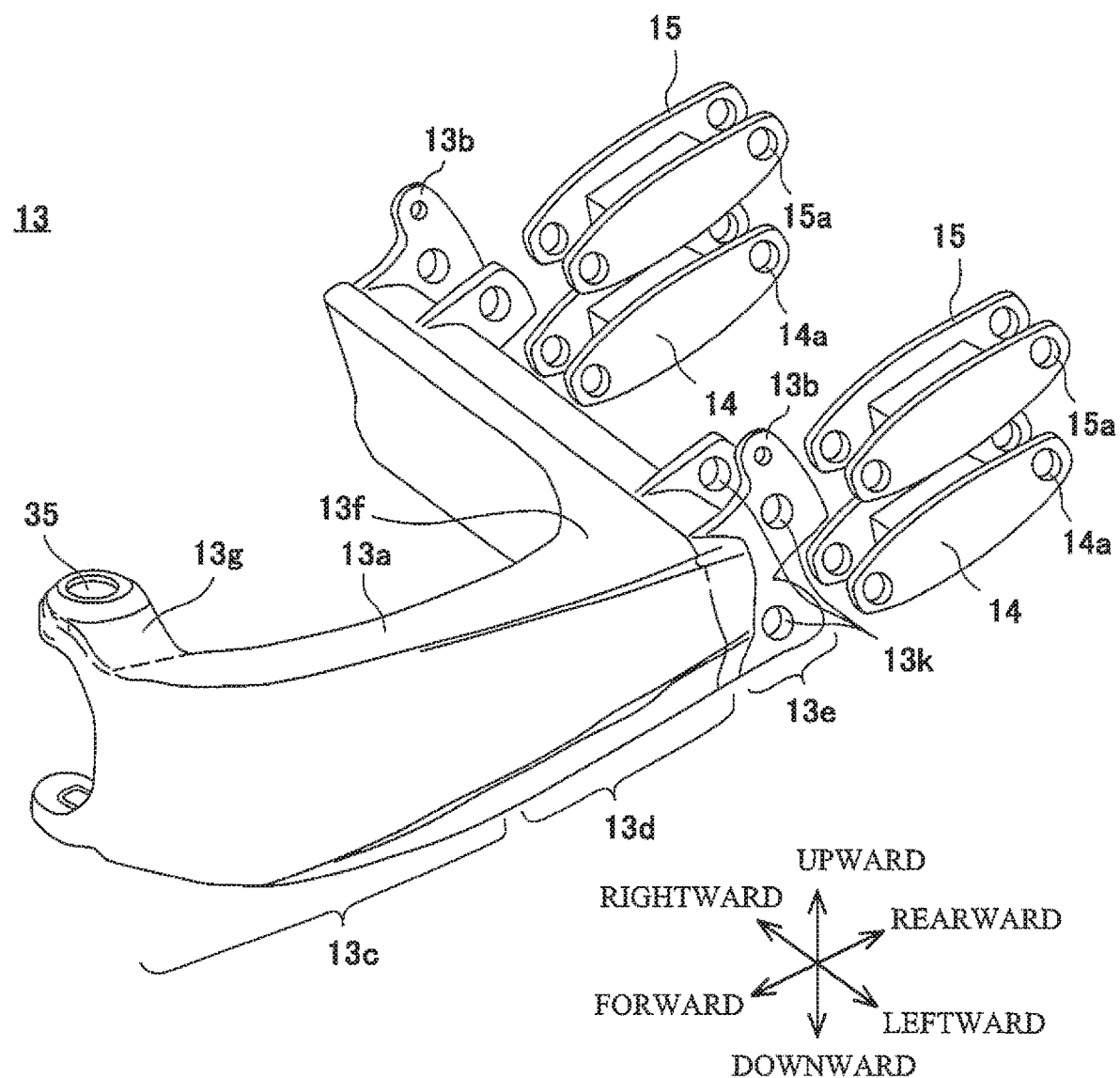
FIG. 3 is a perspective view of a part of the front wheel supporting structure shown in FIG. 1.

FIG. 1 is a left side view of major components of a motorcycle 1 according to an embodiment. FIG. 2 is a cross-sectional view of a front wheel supporting structure 6 shown in FIG. 1, taken along a plane including a steering axis X and a front wheel axis Q. FIG. 3 is a perspective view of a part of the front wheel supporting structure 6 shown in FIG. 1.

The motorcycle 1 of the present embodiment is an exemplary front arm-equipped straddle vehicle operated by a rider straddling a seat 10. As shown in FIG. 1, the motorcycle 1 includes a vehicle body frame member 2, a front wheel 3, a rear wheel 4, an engine 5 serving as a drive source, a front wheel supporting structure 6, a swing arm (rear wheel supporting structure) 20, a handle 7, a handle supporting member 8, a seat supporting member 9, the seat 10, a front suspension 16, a rear suspension 19, and a steering mechanism 22.

In the motorcycle 1, as described in detail later, the vehicle body frame member 2 and the handle supporting member 8 are separately provided, and the handle supporting member 8 is removably coupled to the vehicle body frame member 2.

The front wheel 3 is a steered wheel, and the rear wheel 4 is a driven wheel. The engine 5 is disposed between the front wheel 3 and the rear wheel 4 and generates a drive power for travel of the vehicle. The vehicle body frame member 2 extends in a forward-rearward direction and supports the front wheel 3 at its front portion and the rear wheel 4 at its rear portion. The vehicle body frame member 2 further supports the engine 5 between the front and rear wheels 3 and 4.

In the present embodiment, the drive source is embodied by the engine 5 which is an internal combustion engine. The engine 5 includes: a piston reciprocated by explosion occurring in a combustion chamber; and a crank shaft connected to the piston to convert the reciprocal motion of the piston to rotational motion. The engine 5 further includes a clutch disposed on one side in the axial direction of the crank shaft and a generator disposed on the other side in the axial direction of the crank shaft. The clutch switches between a transmission state in which the rotatory power of the crank shaft is transmitted to a transmission and a non-transmission state in which power transmission to the transmission is disabled. The generator transmits the rotatory power of the crank shaft to a rotor to rotate the rotor and thereby generate electricity.

In the engine 5 of the present embodiment, a cylinder block 5e forming the combustion chamber is disposed in a forward-inclined posture such that the cylinder block 5e is inclined forward and upward from the crank shaft. The transmission is disposed rearward of the crank shaft. The engine 5 includes a crank case enclosing the crank shaft and the transmission adjacent to the crank shaft. Thus, the crank case is approximately L-shaped in side view. Therefore, when the engine 5 includes the transmission, the cylinder block 5e and a cylinder head 5f are located in a relatively upper and forward portion of the engine 5.

The engine 5 includes a clutch cover 5a disposed on one side with respect to the crank case in the vehicle width direction and covering the clutch. The engine 5 further includes a generator cover 5b disposed on the other side with respect to the crank case in the vehicle width direction and covering the generator.

Inside the crank case, a circulation mechanism that circulates a lubricating oil is provided for cooling of heat-generating portions and lubrication of sliding portions. Provided as the circulating mechanism is an oil pan 5c that recovers and stores an oil used for cooling or lubrication, and the oil pan 5c is located in a lower portion of the engine 5, i.e., below the crank case. The lubricating oil stored in the oil pan 5c is sucked by an oil pump, cooled by an oil cooler, and then supplied to the engine 5's internal portions which need lubrication.

To the engine 5 of the present embodiment is connected an exhaust pipe 21 through which exhaust gas generated by combustion in the combustion chamber is discharged. The upstream end of the exhaust pipe 21 in the direction of flow of exhaust gas is connected to a front portion of the engine 5. The exhaust pipe 21 extends downward from the upstream end in the direction of flow of exhaust gas and then extends in a region below the engine 5. In the region below the engine 5, the exhaust pipe 21 extends rearward toward the downstream side in the direction of flow of exhaust gas; namely, in the region below the engine 5, the exhaust pipe 21 extends in the forward-rearward direction to a location rearward of the engine 5.

The rotatory power modulated by the transmission is transmitted, via a power transmission mechanism such as a chain, belt, or drive shaft, to the rear wheel 4 which is a driven wheel. As a result, the rear wheel 4 is rotationally driven.

The vehicle body frame member 2 supports a power transmission mechanism for transmitting the power of the engine 5 to the driven wheel and also supports a drive source for generating power necessary for driving of the motorcycle 1 and transmitting the generated power to the driven wheel. When the drive source is the engine 5, it is preferable for the vehicle body frame member 2 to support peripheral components necessary for operation of the engine 5, such as an intake system, an engine controller, a battery, and a regulator.

It is preferable that shell components such as a cowl component and a fuel tank which constitute the vehicle body shell of the motorcycle 1 be removably mounted to the vehicle body frame member 2. Riding posture-defining components such as the seat 10, the handle 7, and pedals, which are in contact with the rider riding the motorcycle and define the riding posture of the rider, are also removably mounted to the vehicle body frame member 2.

To a rear portion of the vehicle body frame member 2 is connected a front portion of the swing arm 20 serving as a rear wheel supporting structure. The swing arm 20 extends in the forward-rearward direction and supports the rear wheel 4 at its rear portion. The rear wheel 4 is supported by the rear portion of the swing arm 20 so as to be rotatable about a rear wheel axis which is a rotation axis extending in the vehicle width direction.

The front portion of the swing arm 20 is supported by the rear portion of the vehicle body frame member 2 so as to be angularly movable about a swinging axis of the rear wheel 4, the swinging axis extending in the vehicle width direction. Thus, the swing arm 20 supports the rear wheel 4 in a suspended manner such that the rear wheel 4 is movable in the upward-downward direction relative to the vehicle body frame member 2.

The rear suspension 19 is disposed rearward of the vehicle body frame member 2. The rear suspension 19 absorbs shock transmitted from the rear wheel 4. The rear suspension 19 is configured to increase and reduce its end-to-end length by expansion and contraction while exhibiting damping property and resilient property.

Specifically, one end of the rear suspension 19 is directly or indirectly connected to the vehicle body frame member 2, while the other end of the rear suspension 19 is directly or indirectly connected to the swing arm 20. Angular movement of the swing arm 20 about the swinging axis of the rear wheel 4 relative to the vehicle body frame member 2 causes a change in the distance between the location at which one end of the rear suspension 19 is connected and the location at which the other end is connected. The rear suspension 19 generates an expansion or contraction force against the distance change to prevent rapid angular movement of the swing arm 20.

The rear suspension 19 is disposed along a plane perpendicular to the vehicle width direction. In the present embodiment, the two ends of the rear suspension 19 are indirectly connected to the vehicle body frame member 2 and the swing arm 20, respectively, via a link mechanism for the rear suspension.

The vehicle body frame member 2 supports the front wheel 3 via the front wheel supporting structure 6 in such a manner that the front wheel 3 is angularly movable about the steering axis X extending in the upward-downward direction. The traveling motorcycle 1 is steered by angular movement of the front wheel 3 about the steering axis X, and this steering changes the travel direction. The steering mechanism employing the front wheel supporting structure 6 is of the so-called hub steering type.

As shown in FIG. 2, the front wheel 3 has a hub portion as a radially inner portion, which is offset in the axial direction of the front wheel 3 with respect to the axial center of the front wheel 3. To the hub portion of the front wheel 3 is fixed a front axle 11 located at the radial center of the front wheel 3 and extending in the axial direction of the front wheel 3 through the axial center of the front wheel 3.

A knuckle member (rotatably supporting member) 12 covers the front axle 11 from outside in the radial direction, with a rotatably supporting bearing 34 interposed therebetween. The knuckle member 12 is disposed radially inward of the front wheel 3, and supports the front axle 11 via the rotatably supporting bearing 34 in such a manner that the front axle 11 is rotatable about its own axis. In this way, the knuckle member 12 rotatably supports the front wheel 3 in such a manner that the front wheel 3 is rotatable about the front wheel axis Q which is a rotation axis.

Thus, the front wheel 3 rotates relative to the knuckle member 12. For this reason, a brake unit 23 for braking the rotation of the front wheel 3 is fixed to the knuckle member 12. Specifically, a brake caliper for blocking the rotation of a brake disc rotating together with the front wheel 3 is fixed to the knuckle member 12.

The knuckle member 12 is disposed in a region including the steering axis X and passing through the axial center of the front wheel 3. A front portion of the support arm 13 faces the radial outside of the knuckle member 12. The front portion of the support arm 13 supports the knuckle member 12 via a steering bearing 35 extending along the steering axis X.

Specifically, a pair of rotatably supporting portions 13g spaced from each other in the upward-rearward direction is provided at the front portion of the support arm 13. The rotatably supporting portions 13g extend in the vehicle width direction from a hub-facing portion of the support arm 13 that faces the hub portion of the front wheel 3 in the vehicle width direction to a region located inwardly of the front wheel 3 in the vehicle width direction and including the steering axis X. The rotatably supporting portions 13g have through holes extending in the upward-downward direction.

Into through holes 12a and 13h is inserted a supported portion 37 formed in the shape of a cylinder with a bottom facing the front axle 11. The supported portion 37 is rotatably supported by the rotatably supporting portions 13g via the steering bearing 35 so as to be angularly movable about the steering axis X. The supported portion 37 is fixed to the knuckle member 12. Thus, the knuckle member 12 is supported by the support arm 13 via the supported portion 37 and the steering bearing 35.

Thus, the support arm 13 supports the knuckle member 12 in such a manner that the knuckle member 12 is angularly movable about the steering axis X extending in the upward-downward direction, and the support arm 13 extends rearward from the knuckle member 12. The support arm 13 is configured as a rigid member. The support arm 13 of the present embodiment supports the knuckle member 12 only on one side of the vehicle body in the vehicle width direction (the left side in the present embodiment).

The front wheel supporting structure 6 supports the front wheel 3 in a suspended manner such that the front wheel 3 is movable in the upward-downward direction relative to the vehicle body frame member 2. The front wheel supporting structure 6 includes the knuckle member 12, the support arm (front arm) 13, and a supporting link mechanism 30.

Specifically, the support arm 13 supporting the front wheel 3 via the knuckle member 12 is supported so as to be angularly movable about a swinging axis of the front wheel 3, the swinging axis being defined at a location rearward of the front wheel 3 and extending in the vehicle width direction. Being connected to the vehicle body frame member 2 via the supporting link mechanism 30, the support arm 13 can increase the flexibility in determining the location of the swinging axis of the front wheel 3.

As shown in FIG. 3, the support arm 13 includes an arm main portion 13a extending in the forward-rearward direction and arm rear portions 13b disposed rearward of the arm main portion 13a. The arm rear portions 13b are connected to the front suspension 16. The arm rear portions 13b are disposed between the exhaust pipe 21 and the front wheel 3.

More specifically, suspension link members 17 extending in the upward-downward direction are linked to the arm rear portions 13b on the opposite sides of the vehicle body in the vehicle width direction. The suspension link members 17 are linked so as to be angularly movable relative to the support arm 13 about a swinging axis extending in the vehicle width direction. The suspension link members 17 are respectively linked to L-shaped angle members 18.

Each angle member 18 is supported at its curved portion so as to be angularly movable about a swinging axis extending in the forward-rearward direction. In the present embodiment, the angle member 18 is supported by the handle supporting member 8 described later so as to be angularly movable.

The suspension link member 17 is linked to one end of the angle member 18, and the front suspension 16 is linked to the other end of the angle member 18. Thus, upon upward-downward movement of the suspension link member 17, the location at which the front suspension 16 and the angle member 18 are connected varies in the vehicle width direction. With the aid of the angle member 18 and the suspension link member 17, the force applied from the support arm 13 in the upward-downward direction can be converted to a force acting in the vehicle width direction.

In the present embodiment, the angle member 18 disposed on one side in the vehicle width direction is linked to one end of the front suspension 16 in the vehicle width direction, and the other angle member 18 disposed on the other side in the vehicle width direction is linked to the other end of the front suspension 16 in the vehicle width direction.

The front suspension 16 is disposed forward of the engine 5. The front suspension 16 absorbs shock transmitted from the front wheel 3. In an example, the front suspension 16 is disposed along a plane perpendicular to the forward-rearward direction. The front suspension 16 is configured to increase and reduce its end-to-end length by expansion and contraction while exhibiting damping property and resilient property.

Specifically, upon movement of the support arm 13 in the upward-downward direction relative to the vehicle body frame member 2, the suspension link members 17 cause angular movement of the angle members 18. This changes the distance between the two ends of the front suspension 16 which are respectively connected to the angle members 18. The front suspension 16 generates an expansion or contraction force against the distance change to prevent rapid upward-downward movement of the support arm 13.

In the present embodiment, a load applied from the support arm 13 is input to each of the axial ends of the front suspension 16. The directions of the input loads are opposite to each other, and the input loads cancel each other in the vehicle width direction. This allows a reduction in the rigidity required for the handle supporting member 8 to support the front suspension 16.

As shown in FIG. 2, the support arm 13 extends to a region rearward of the front wheel 3. The support arm 13 is approximately L-shaped in plan view. Specifically, the support arm 13 includes the arm main portion 13*a* extending in the forward-rearward direction in a region located on one side with respect to the front wheel 3 in the vehicle width direction and the arm rear portion 13*b* continuous with a rear portion of the arm main portion 13*a* and extending in the vehicle width direction.

More specifically, the surface of the arm main portion 13*a* that faces the front wheel 3, i.e., the inner side surface of the arm main portion 13*a* in the vehicle width direction, is inclined from front to rear outwardly in the vehicle width direction. The arm rear portion 13*b* is formed to have a larger dimension in the vehicle width direction than the arm main portion 13*a*. The arm rear portion 13*b* extends in the vehicle width direction away from the arm main portion 13*a* through the center of the vehicle body in the vehicle width direction. The arm rear portion 13*b* of the present embodiment extends in the vehicle width direction from a region located on one side with respect to the front wheel 3 in the vehicle width direction to a region located on the other side with respect to the front wheel 3 in the vehicle width direction.

It is preferable that the arm rear portion 13*b* be disposed in a region inward of outermost points on the engine 5 which are defined on the opposite sides of the engine 5 in the vehicle width direction. The support arm 13 of the present embodiment is formed by molding. This offers enhanced flexibility in thickness design of the support arm 13, thus allowing an increase in rigidity of the support arm 13.

The supporting link mechanism 30 includes a pair of lower and upper supporting link members 14 and 15. The paired supporting link members 14 and 15 are linked to the support arm 13 at two locations on the arm rear portion 13*b* (the rear portion of the support arm 13) which are spaced in the upward-downward direction, each of the supporting link members 14 and 15 being pivotable about a link axis extending in the vehicle width direction.

The paired supporting link members 14 and 15 extend rearward from the arm rear portion 13*b* and each have a rear portion pivotally linked to the vehicle body frame member 2. In the present embodiment, a plurality of pairs (e.g., two pairs) of supporting link members 14 and 15 are provided, and the pairs are spaced in the vehicle width direction. In the present embodiment, the left pair of supporting link members 14 and 15 and the right pair of supporting link members 14 and 15 are respectively disposed at the opposite ends of the support arm 13 in the vehicle width direction. In the present embodiment, the left and right pairs of link members 14 and 15 are disposed in regions outward of the front wheel 3 in the vehicle width direction.

The support arm 13 is formed to be long enough to extend rearward from the front wheel supporting location beyond the rear end of the front wheel 3. In other words, in side view, the paired supporting link members 14 and 15 are located rearward of the front wheel 3. The paired supporting link members 14 and 15 are formed to be shorter than the support arm 13 in the forward-rearward direction.

The paired supporting link members 14 and 15 (i.e., all the link members) extend in the forward-rearward direction in a region below the upper end of the front wheel 3. The paired supporting link members 14 and 15 of the present embodiment extend in the forward-rearward direction in a region below the rotation axis of the front wheel, brake disc, or crank shaft. Thus, the force applied from the support arm 13 can readily be transmitted to the vehicle body frame member 2 as a compression force acting in the forward-rearward direction, and the force can be prevented from being transmitted as a bending force to the vehicle body frame member 2.

The paired supporting link members 14 and 15 are disposed in a region below the center of the engine 5 in the upward-downward direction. In an example, the paired supporting link members 14 and 15 are disposed below the rotation axis of the crank shaft of the engine 5.

When paired upper and lower cases are combined to form a crank case, the paired supporting link members 14 and 15 are disposed below the contact plane at which the paired upper and lower cases are combined.

The paired supporting link members 14 and 15 are disposed below the lower end of at least one of the cylinder head 5*f*, the exhaust port, and the combustion chamber. In the motorcycle 1, the left and right pairs of supporting link members 14 and 15 are located on the opposite sides with respect to the exhaust pipe 21 in the vehicle width direction and extend in the forward-rearward direction.

The handle 7 is provided to be held by the two hands of a rider assuming a riding posture. The handle supporting member 8 is coupled to the vehicle body frame member 2 and supports the handle 7. The handle supporting member 8 of the present embodiment supports the handle 7 in such a manner that the handle 7 is angularly movable about a stem axis. A steering stem 42 extending in the upward-downward direction is inserted in the handle supporting member 8, and the handle 7 is connected to the upper end of the steering stem 42.

The handle supporting member 8 of the present embodiment is spaced from the vehicle body frame member 2 and is indirectly and removably coupled to the vehicle body frame member 2 via the engine 5. In an example, the handle supporting member 8 is coupled to the engine 5 by a plurality of fastening members. The handle supporting member 8 is coupled to the engine 5 by fastening of the fastening members which may be bolts inserted from outside in the vehicle width direction.

The handle supporting member 8 is fastened to an upper front portion of the engine 5. Specifically, in side view, the handle supporting member 8 is fastened to the engine 5 at two locations spaced both in the upward-downward direction and in the leftward-rightward direction. The handle supporting member 8 of the present embodiment includes a front fastening portion 8a and a rear fastening portion 8b. The front fastening portion is fastened to a front portion of the cylinder block 5e, and the rear fastening portion 8b is fastened to a rear portion of the cylinder head 5f.

The front fastening portion 8a of the handle supporting member 8 is disposed below the rear fastening portion 8b of the handle supporting member 8. The handle supporting member 8 has a stem supporting portion 8c in which the steering stem 42 is inserted, and the stem supporting portion 8c is disposed forward of and above the fastening portions 8a and 8b.

In side view, the handle supporting member 8 has portions which extend forward and upward from the front fastening portion 8a and the rear fastening portion 8b, respectively, and which join at their front ends to form a V-shape. At the junction is provided the stem supporting portion 8c. That is, in side view, the handle supporting member 8 is shaped such that its dimension in the upward-downward direction decreases from rear to front, and the stem supporting portion 8c is provided at the front end of the handle supporting member 8.

The handle supporting member 8 includes the front fastening portion 8a and rear fastening portion 8b which are provided on each of the opposite sides of the engine 5 in the vehicle width direction. Thus, the handle supporting member 8 is fastened to the engine 5 by at least four fastening portions. The stem supporting portion 8c is provided between the left pair of fastening portions 8a and 8b and the right pair of fastening portions 8a and 8b in the vehicle width direction. Thus, in plan view, the handle supporting member 8 is shaped such that its dimension in the vehicle width direction decreases from rear to front, and the stem supporting portion 8c is provided at the front end of the handle supporting member 8.

In the present embodiment, as described above, the handle supporting member 8 is disposed at a relatively upper location on the vehicle body and supported by an upper front portion of the engine 5. Thus, the handle supporting member 8 is spaced from the vehicle body frame member 2 and indirectly connected to the vehicle body frame member 2. Accordingly, the size and weight of the handle supporting member 8 can be made smaller than when the handle supporting member 8 is directly connected to the vehicle body frame member 2.

Since the handle supporting member 8 is provided separately from the vehicle body frame member 2, handle supporting members 8 of different shapes can easily be combined with the same vehicle body frame member 2. For example, a plurality of handle supporting members 8 differing in at least one of the location and posture of the stem supporting portion 8c relative to the fastening portions 8a and 8b are prepared. In this case, the location and posture of the handle 7 can be changed depending on the rider's preference or the vehicle characteristics by replacing the fastened handle supporting member 8 with a different handle supporting member 8 without replacing the vehicle body frame member 2.

The seat supporting member 9 is removably coupled to the vehicle body frame member 2 and supports the seat 10. The seat supporting member 9 is provided separately from the vehicle body frame member 2 and the handle supporting member 8. The seat supporting member 9 extends rearward from the upper end of the vehicle body frame member 2 or the upper end of the rear portion of the engine 5. The seat supporting member 9 of the present embodiment is coupled to the vehicle body frame member 2.

Thus, the front end of the seat supporting member 9 is located in the vicinity of the rear portion of the engine 5; in other words, the front end of the seat supporting member 9 is located rearward of the cylinder block 5e. Accordingly, the seat supporting member 9 can have a smaller dimension in the forward-rearward direction and hence a smaller size and weight than when the seat supporting member 9 and the handle supporting member 8 are integrally provided.

Since the seat supporting member 9 is provided separately from the vehicle body frame member 2, seat supporting members 9 of different shapes can easily be combined with the same handle supporting member 8 and vehicle body frame member 2. For example, a plurality of seat supporting members 9 differing in the location of the seat supporting portion relative to a fastening portion fastened to the vehicle body frame member 2 are prepared. In this case, the location of the seat 10 can be changed depending on the rider's preference or the vehicle characteristics by replacing the fastened seat supporting member 9 with a different seat supporting member 9 without replacing the vehicle body frame member 2.

Furthermore, in the present embodiment, the combination of the seat supporting member 9 and the handle supporting member 8 can be freely chosen since the seat supporting member 9 and the handle supporting member 8 are separately provided. Thus, a wide variety of vehicles can easily be produced without significant increase in manufacturing cost. It is also easy to adjust the vehicle to the body type of the rider.

The motorcycle 1 of the present embodiment includes a steering mechanism 22 that transmits a steering force to the front wheel 3 upon a steering operation by the rider. Specifically, the steering mechanism 22 is a steering link mechanism which, when the handle 7 is angularly moved about the stem axis by the rider, angularly moves the knuckle member 12 about the steering axis X according to the amount of the angular movement of the handle 7.

The steering mechanism 22 links the knuckle member 12 to the steering stem 42. The steering mechanism 22 includes a plurality of steering link members disposed at locations away from the support arm 13. The steering mechanism 22 includes a steering member 40 connected to the knuckle member 12 and extending in the upward-downward direction and a link unit 41 connected to the steering member 40 at a location above the front wheel 3.

The link unit 41 is composed of a plurality of link members, and is connected to the lower end of the steering stem 42 inserted in the handle supporting member 8. Upon rotation of the handle 7 about the axis of the steering stem 42, the steering mechanism 22 steers the front wheel 3 via the link unit 41 and the steering member 40.

The link unit 41 is constituted by a plurality of steering link members both ends of which angularly move about an axis extending in the vehicle width direction. Each of these steering link members can angularly move about a point at which the link member is connected to the steering stem 42 and thus, even when the steering member 40 is moved along with the front wheel 3 in the upward-downward direction, transmission of a ground load to the steering stem 42 is prevented.

With the motorcycle 1 configured as described above, a ground load applied from a ground surface to the front wheel 3 is transmitted as a force acting mainly in the forward-rearward direction to the vehicle body frame member 2 via the support arm 13 and the paired supporting link members 14 and 15. Thus, a load from the vehicle body frame member 2 is not readily transmitted to the handle supporting member 8 which is disposed above and away from the vehicle body frame member 2.

Additionally, since the handle supporting member 8 is connected to the knuckle member 12 via the steering link members, a load from the support arm 13 is not readily transmitted to the handle supporting member 8. Thus, the handle supporting member 8 does not need to be rigid enough to resist ground loads.

For example, the handle supporting member 8 may have rigidity sufficient only for enabling the rider to maintain the riding posture, and the influence of restrictions as to the rigidity can be reduced compared to when the handle supporting member 8 needs to bear ground loads. Therefore, the handle supporting member 8 can be changed from one type to another depending on the required riding posture on the motorcycle 1 or the required vehicle characteristics of the motorcycle 1, and standardization of the rest of the motorcycle 1 is easy.

Additionally, since the handle supporting member 8 of the present embodiment is fixed to an upper front portion of the engine 5, the dimensions of the handle supporting member 8 in the forward-rearward direction and upward-downward direction can be reduced. Thus, weight reduction of the handle supporting member 8 can be achieved. Specifically, the rear end of the handle supporting member 8 is disposed forward of a transmission-enclosing region of the engine 5. The lower end of the handle supporting member 8 is disposed above a crank shaft-enclosing region of the engine 5.

According to the present embodiment, the handle supporting member 8 is formed such that its outer shape in side and plan views is a V-shape tapering toward the steering stem 42. This makes it easy to increase the rigidity of the handle supporting member 8 while reducing the weight of the handle supporting member 8.

The rear portions of the handle supporting member 8 which are provided on the opposite sides in the vehicle width direction are coupled to the engine 5 in the vehicle width direction. This eliminates the need for a cross portion for coupling the handle supporting member 8 in the vehicle width direction.

Additionally, since the handle supporting member 8 is fastened to the engine 5 in the vehicle width direction, it is possible to reduce the deformation of the handle supporting member 8 in the vehicle width direction and also to reduce the thickness dimension in the vehicle width direction of the handle supporting member 8. Thus, for example, the handle supporting member 8 can be formed to have a rectangular cross-section having a smaller dimension in the vehicle width direction than in the upward-downward direction, and weight reduction of the handle supporting member 8 is easy.

A ground load is transmitted to the vehicle body frame member 2 via the support arm 13 and the paired supporting link members 14 and 15. At this instant, a compression or tensile force acts on the paired supporting link members 14 and 15 mainly in the axial direction since the paired supporting link members 14 and 15 extend in the forward-rearward direction approximately along the support arm 13. This can reduce a bending force acting on the paired supporting link members 14 and 15 and reduce the influence of structural restrictions imposed for prevention of bending deformation.

Thus, the paired supporting link members 14 and 15 can easily be changed from one type to another depending on the required vehicle behaviors, and standardization of the support arm 13 is easy. Accordingly, the number of components common to a plurality of types of vehicles can be increased, and reduction in manufacturing cost can be achieved.

The motorcycle 1 of the present embodiment allows standardization of the vehicle body frame member 2. Additionally, since the motorcycle 1 has a structure in which the engine 5 serving as a drive source is supported from below, the type of the drive source can easily be changed. Thus, the vehicle body frame member 2 can easily be standardized for different types of drive sources. Hereinafter, the details of the vehicle body frame member 2, the support arm 13, and the supporting link members 14 and 15 will be described.

[Vehicle Body Frame Member]

As shown in FIG. 1, the vehicle body frame member 2 includes: a rear wheel supporting portion 2a supporting the rear wheel 4; a front wheel supporting portion 2e connected to the supporting link members 14 and 15 and supporting the front wheel 3; and a front-rear coupling portion 2b extending in the forward-rearward direction from the front wheel supporting portion 2e to the rear wheel supporting portion 2a.

The rear wheel supporting portion 2a swingably supports the swing arm 20. The rear wheel supporting portion 2a also supports the rear suspension 19. That is, the rear wheel supporting portion 2a forms a rear portion of the vehicle body frame member 2 and functions to bear a ground load applied to the vehicle body frame member 2 through the swing arm 20 and the rear suspension 19.

The rear wheel supporting portion 2a extends along the rear surface of the engine 5 in the upward-downward direction. The rear wheel supporting portion 2a extends to both sides in the upward-downward direction, at least with respect to the swinging axis of the swing arm 20. The rear wheel supporting portion 2a of the present embodiment is fastened to the upper surface of the crank case of the engine 5 by a fastening member.

The front wheel supporting portion 2e swingably supports the supporting link members 14 and 15. The front wheel supporting portion 2e extends in the upward-downward direction to support each of the above paired supporting link members 14 and 15 arranged in the upward-downward direction. The front wheel supporting portion 2e of the present embodiment supports each of the supporting link members 14 and 15 at a location forward of the engine 5.

The vehicle body frame member 2 has a connection portion connected directly or indirectly to the support arm 13. The vehicle body frame member 2 of the present embodiment has the front wheel supporting portion 2e as the connection portion and is indirectly connected to the support arm 13 via the supporting link members 14 and 15.

Additionally, the front wheel supporting portion 2e has a base portion 2f. This base portion 2f is shaped to extend rearward in such a manner that the dimension of the base portion 2f in the upward-downward direction decreases in a direction rearward of the locations at which the paired supporting link members 14 and 15 are connected to the base portion 2f. In the present embodiment, the base portion 2f of the front wheel supporting portion 2e in side view is in the shape of a triangle having one vertex (front vertex A1) at the front end of the base portion 2f.

The front wheel supporting portion 2e has a rear portion fixed to the engine 5 and a front portion disposed forward of the engine 5. Specifically, the front wheel supporting portion 2e is fixed to the engine 5 at two rear locations on the base portion 2f which are spaced in the upward-downward direction. The front wheel supporting portion 2e of the present embodiment is fixed to the engine 5 at two locations on the base portion 2f, one of which corresponds to the location of the upper vertex A2 of the triangle formed by the base portion 2f in side view and the other of which corresponds to the location of the rear vertex A3 of the triangle.

The front wheel supporting portion 2e is disposed in a region below the center of the engine 5 in the upward-downward direction. Accordingly, the base portion 2f of the front wheel supporting portion 2e is disposed in a region below the center of the engine 5 in the upward-downward direction. Specifically, the base portion 2f of the front wheel supporting portion 2e is disposed below the rotation axis of the crank shaft of the engine 5. The front-rear coupling portion 2b is fastened to the engine 5 by a fastening member and removably supports the engine 5.

The vehicle body frame member 2 of the present embodiment is provided on each of the opposite sides of the motorcycle 1 in the vehicle width direction. Specifically, the vehicle body frame member 2 disposed on one side in the vehicle width direction is connected to the pair of lower and upper supporting link members 14 and 15 disposed on the one side in the vehicle width direction, and extends rearward. The vehicle body frame member 2 disposed on the other side in the vehicle width direction is connected to the pair of lower and upper supporting link members 14 and 15 disposed on the other side in the vehicle width direction, and extends rearward. The vehicle body frame members 2 disposed on the opposite sides in the vehicle width direction are coupled in the vehicle width direction via the engine 5.

The vehicle body frame member 2 disposed on one side in the vehicle width direction is fastened to one side surface of the engine 5 in the vehicle width direction. The vehicle body frame member 2 disposed on the other side in the vehicle width direction is fastened to the other side surface of the engine 5 in the vehicle width direction.

The rear supporting portions of the two vehicle body frame members 2 of the present embodiment are coupled in the vehicle width direction via a bearing supporting member provided in a portion which supports the swing arm 20. Thus, the two vehicle body frame members 2 are coupled to each other in the vehicle width direction at a plurality of portions spaced in the forward-rearward direction.

The front-rear coupling portion 2b is disposed in a region below the center of the engine 5 in the upward-downward direction. Specifically, the front-rear coupling portion 2b is disposed below the rotation axis of the crank shaft of the engine 5. The front-rear coupling portion 2b of the present embodiment extends rearward through a region extending in the upward-downward direction between the locations at which the paired supporting link members 14 and 15 are connected to the front wheel supporting portion 2e.

The front-rear coupling portion 2b has a longitudinal portion 2g coupled to the base portion 2f of the front wheel supporting portion 2e. The longitudinal portion 2g is formed to longitudinally extend rearward with the dimension in the upward-downward direction being uniform. The dimension of the longitudinal portion 2g in the upward-downward direction is smaller than the maximum dimension of the base portion 2f in the upward-downward direction. In other words, the upper and lower ends of the longitudinal portion 2g are located at heights lying between the locations at which the paired supporting link members 14 and 15 are connected to the front wheel supporting portion 2e. Thus, the longitudinal portion 2g of the front-rear coupling portion 2b is formed to be smaller than the front wheel supporting portion 2e in the upward-downward direction. This can prevent size increase of the vehicle body frame member 2.

The longitudinal portion 2g lies outside the engine 5 in the vehicle width direction. When the longitudinal portion 2g of the present embodiment is viewed in a direction perpendicular to the forward-rearward direction, the lower surface of the longitudinal portion 2g extends along an inclined plane inclined upwardly toward the outside in the vehicle width direction. Specifically, the longitudinal portion 2g is formed such that its cross-section perpendicular to the forward-rearward direction is approximately rectangular, and the long sides of the cross-section are inclined with respect to the vertical line and extend obliquely upward toward the outside in the vehicle width direction. The base portion 2f of the present embodiment extends above the lower surface of the oil pan 5c. The base portion 2f is inclined upwardly from front to rear. Thus, the rear wheel supporting portion 2a located above the front wheel supporting portion 2e can be coupled to the front wheel supporting portion 2e with a relatively short distance between the supporting portions.

The front-rear coupling portions 2b disposed on the opposite sides of the vehicle body in the vehicle width direction are inclined from front to rear inwardly in the vehicle width direction and are coupled in the vehicle width direction at their rear portions. That is, the front-rear coupling portions 2b are inclined in such a manner that the distance between the front-rear coupling portions 2b in the vehicle width direction decreases from front to rear. As described above, the paired vehicle body frame members 2 disposed on the opposite sides in the vehicle width direction have respective front portions coupled in the vehicle width direction via the engine 5 and respective rear portions coupled in the vehicle width direction via members for supporting the swing arm 20, such as a bearing, a collar member, and a shaft member.

The front-rear coupling portions 2b extend in the forward-rearward direction through regions outward of the engine 5 in the vehicle width direction, the regions being inward of the outermost side surfaces of the engine 5 (the side surfaces of the clutch cover 5a and generator cover 5b of the engine 5 in the present embodiment) in the vehicle width direction.

In other words, the longitudinal portions of the front-rear coupling portions 2b extend along the outer wall of the crank case through regions inward of the outer edge surfaces in the vehicle width direction of cover members (the generator cover 5b and the clutch cover 5a) provided outwardly of the crank case in the vehicle width direction.

The lower surfaces of the vehicle body frame members 2, in particular the lower surfaces of the longitudinal portions 2g of the front-rear coupling portions 2b, lie above the lowermost surface of the engine 5, in particular the lower surface of the oil pan 5c, and are inclined forward toward the outside in the vehicle width direction.

Thus, when the vehicle body is banked during travel, it is possible to prevent the maximum bank angle from being limited by the front-rear coupling portions 2b. In other words, while the vehicle body is banked, the front-rear coupling portion 2b closer to the ground surface can be located inwardly of the engine 5 in the vehicle width direction. This can improve the maneuverability of the vehicle body during travel.

The term "bank angle" as used herein refers to the angle between the vertical line and the center line of the vehicle body that is orthogonal to the vehicle width direction and passes through the center in the vehicle width direction of the vehicle body. Thus, when the vehicle body of the motorcycle 1 is banked during travel, the maximum bank angle is limited by the engine 5 rather than by the vehicle body frame members 2.

In the present embodiment, upper portions of the rear wheel supporting portions 2a extending in the upward-downward direction are coupled to the seat supporting member 9. Since each of the rear wheel supporting portions 2a disposed on the opposite sides in the vehicle width direction is coupled to the seat supporting member 9 extending in the vehicle width direction, the rigidity in the vehicle width direction can be enhanced. Additionally, since the seat supporting member 9 is coupled to the upper portions of the rear wheel supporting portions 2a extending in the upward-downward direction, size increase of the seat supporting member 9 can be prevented. Furthermore, since the seat supporting member 9 extends rearward of the engine 5 from a location at which the seat supporting member 9 is coupled to the rear wheel supporting portions 2a, size increase of the seat supporting member 9 can be more reliably prevented than when the seat supporting member 9 is coupled to the engine 5.

The front-rear coupling portions 2b lie in regions lateral to the engine 5 in the vehicle width direction and are coupled to the sides of the engine 5 in the vehicle width direction. This eliminates the need for an additional component for fixing the front-rear coupling portions 2b, thus preventing size increase.

[Support Arm]

As shown in FIGS. 1 and 2, the support arm 13 extends rearward beyond the front wheel 3. In side view, the arm rear portion 13b is located rearward of the rear edge of the front wheel 3 and mildly curved downwardly toward the arm main portion 13a to present an L-shape. The arm main portion 13a and the arm rear portion 13b may be provided separately or integrally.

The support arm 13 is provided in such a manner that a straight line Y passing through the axial center of the front wheel 3 and a location at which the support arm 13 and the supporting link member 15 are coupled is inclined upwardly from front to rear. In side view, the arm main portion 13a is inclined upwardly from front to rear, and the angle between the straight line Y and the horizontal line is set to be more than 0° and less than 45°. The support arm 13 is formed to be longer than the supporting link members 14 and 15 in the forward-rearward direction.

The support arm 13 includes an inclined portion 13c inclined from front to rear outwardly in the vehicle width direction, a base portion 13d continuous with a rear end of the inclined portion 13c and extending in the forward-rearward direction, and an extension portion 13e extending in the vehicle width direction from a rear end of the base portion 13d. Having the inclined portion 13c, the support arm 13 ensures a wide steering angle of the front wheel 3.

The location of the boundary between the inclined portion 13c and the base portion 13d can be freely defined. For example, in side view, the boundary may be located rearward of the center of the support arm 13 in the forward-rearward direction. The base portion 13d extends rearward beyond the rear edge of the front wheel 3. The arm rear portion 13b is provided at each of the opposite ends of the extension portion 13e in the vehicle width direction.

A vertical cross-section of the support arm 13, taken perpendicular to the forward-rearward direction, is in the shape of a rectangle extending longitudinally in the upward-downward direction. Thus, the support arm 13 has high rigidity. Between the base portion 13d and the extension portion 13e there is provided a flared portion 13f whose dimension in the vehicle width direction increases from front to rear in top view. This flared portion 13f further enhances the rigidity of the support arm 13.

The steering axis X is defined with respect to the support arm 13. The steering axis X extends in directions including the upward-downward direction. In the present embodiment, the steering axis X is inclined in the forward-rearward direction with respect to the upward-downward direction. Specifically, as shown in FIG. 1, the steering axis X is inclined at a predetermined angle θ (caster angle) to a vertical line Z so as to extend upward from front to rear. Since the steering axis X is defined with respect to the support arm 13, the steering axis X moves relative to the vehicle body frame member 2 upon movement of the support arm 13 relative to the vehicle body frame member 2.

[Link Mechanism]

As shown in FIGS. 1 and 2, the paired left and right link mechanisms 30 provided on the opposite sides of the vehicle body in the vehicle width direction extend rearward along an approximately straight line and are parallel to each other so that the distance between the link mechanisms 30 in the vehicle width direction is constant. Each of the supporting link members 14 and 15 (also referred to as the "lower link member 14" and "upper link member 15" hereinafter) constituting the link mechanisms 30 extends rearward.

In each link mechanism 30, the front end of the lower link member 14 is connected to the arm rear portion 13b via a front pivot pin 25 so as to be rotatable about the axis of the front pivot pin 25. The front end of the upper link member 15 is connected to the arm rear portion 13b via a front pivot pin 26 so as to be rotatable about the axis of the front pivot pin 26.

The rear end of the lower link member 14 is connected to the vehicle body frame member 2 via a rear pivot pin 27 so as to be rotatable about the axis of the rear pivot pin 27. The rear end of the upper link member 15 is connected to the vehicle body frame member 2 via a rear pivot pin 28 so as to be rotatable about the axis of the rear pivot pin 28.

The pitch between the front and rear pivot points of the upper link member 15 and the pitch between the front and rear pivot points of the lower link member 14 are set to be approximately equal. When the motorcycle 1 is placed on a horizontal surface without a seated rider, the angle of inclination of the upper link member 15 to the horizontal direction is smaller than the angle of inclination of the lower link member 14 to the horizontal direction.

The pitch in the upward-downward direction between the location at which the upper link member 15 is connected to the rear pivot pin 28 and the location at which the lower link member 14 is connected to the rear pivot pin 27 is slightly smaller than the pitch in the upward-downward direction between the location at which the upper link member 15 is connected to the front pivot pin 26 and the location at which the lower link member 14 is connected to the front pivot pin 25.

Thus, a straight line L1 passing through the front and rear pivot points of the upper link member 15 and a straight line L2 passing through the front and rear pivot points of the lower link member 14 intersect at an intersection C located rearward of the link mechanism 30. Providing the supporting link members 14 and 15 in this manner enables the support arm 13 to angularly move relative to the vehicle body frame member 2 about a swinging axis passing through the intersection C.

In the present embodiment, it is preferable that the longitudinal portion 2g of the front-rear coupling portion 2b be located in a region bounded by an extension of the axis of the upper link member 15 and an extension of the axis of the lower link member 14. In this case, the occurrence of a bending load acting on the longitudinal portion 2g can be reduced, and weight reduction of the longitudinal portion 2g can be made easier.

In an example, the supporting link members 14 and 15 are H-shaped in top view. At the front and rear ends of the upper link member 14 are provided connection holes 14a, and at the front and rear ends of the lower link member 15 are provided connection holes 15a. The arm rear portion 13b has connection holes 13k. The front-rear coupling portion 2b has connection holes 2d. The connection holes 14a, 15a, 13k, and 2d are open in the vehicle width direction.

The supporting link members 14 and 15 are connected to the arm rear portion 13b by the pivot pins 25 and 26 inserted in the connection holes 14a, 15a, and 13k, and are connected to the front-rear coupling portion 2b by the pivot pins 27 and 28 inserted in the connection holes 14a, 15a, and 2d.

In side view, the supporting link members 14 and 15 disposed on each of the opposite sides of the vehicle body in the vehicle width direction are located below the center of the engine 5 in the upward-downward direction. The supporting link members 14 and 15 of the present embodiment are located below the clutch cover 5a and the generator cover 5b. Thus, the supporting link members 14 and 15 are provided at relatively lower locations on the vehicle body.

The supporting link members 14 and 15 may be configured as plate members extending in the forward-rearward direction. In this case, the extension portion 13e of the support arm 13, or the opposite sides in the vehicle width direction of the front portion of the vehicle body frame member 2, may be formed to present a U-shape in top view. Part of the supporting link members 14 and 15 may be sandwiched by the U-shaped portion, and the U-shaped portion may be coupled to the supporting link members 14 and 15.

As described above, the vehicle body frame member 2 includes the rear wheel supporting portion 2a, the front wheel supporting portion 2e, and the front-rear coupling portion 2b. Since the front-rear coupling portion 2b is provided separately from the engine 5, transmission to the engine 5 of a ground load applied from the front wheel 3 can be reduced, and the ground load can be transmitted toward the rear wheel supporting portion 2a. This can reduce the influence of ground loads on the engine 5, thus allowing a reduction in the rigidity of the engine 5. For example, complication of the structure of the engine 5 or increase in weight of the engine 5 can be prevented.

The front-rear coupling portion 2b lies in a region below the center of the engine 5 in the upward-downward direction and extends in the forward-rearward direction from the front wheel supporting portion 2e to the rear wheel supporting portion 2a. Since the front-rear coupling portion 2b extends in the forward-rearward direction in the lower region, the influence exerted on a region above the vehicle body by the vehicle body frame member 2 serving as a rigid member bearing ground loads can be reduced. This can increase the flexibility in designing the motorcycle 1's upper portion which is significantly associated with the vehicle body shape and the riding posture. Additionally, while the upper portion of the motorcycle 1 is modifiable, the lower portion of the motorcycle 1 can be standardized. Thus, cost in design or manufacturing can be reduced even when a plurality of types of motorcycles 1 having different upper portions are manufactured.

The front-rear coupling portion 2b extends rearward through a region lying between the respective rear ends of the paired supporting link members 14 and 15 in the upward-downward direction. Thus, a ground load applied to the front-rear coupling portion 2b through the pair of supporting link members 14 and 15 can readily be transmitted as an axial load acting in the forward-rearward direction, and the axial load is prevented from being transmitted as a moment to the front-rear coupling portion 2b. This makes it easy to achieve weight reduction of the vehicle body frame member 2.

Additionally, since the front wheel supporting portion 2e has the base portion 2c whose dimension in the upward-downward direction decreases in a direction rearward of the locations at which the paired supporting link members 14 and 15 are connected to the base portion 2c, a ground load applied to the longitudinal portion of the front-rear coupling portion 2b through the pair of supporting link members 14 and 15 can readily be transmitted as a force acting in the forward-rearward direction, and bending deformation of the front-rear coupling portion 2b can be prevented.

The vehicle body frame member 2 is disposed on each of the opposite sides of the vehicle body in the vehicle width direction, and the pair of supporting link members 14 and 15 and the front-rear coupling portion 2b are disposed on each of the opposite sides of the vehicle body in the vehicle width direction. The front-rear coupling portions 2b disposed on the opposite sides of the vehicle body in the vehicle width direction are inclined inwardly in the vehicle width direction in such a manner that the distance between the front-rear coupling portions 2b in the vehicle width direction decreases from front to rear, and the front-rear coupling portions 2b are coupled in the vehicle width direction at their rear portions (in the present embodiment, the front-rear coupling portions 2b are coupled in the vehicle width direction via the engine 5, the rear wheel supporting portion 2a, and the seat supporting member 9).

Thus, the shape presented by the vehicle body frame members 2 in plan view can be trapezoidal, and a ground load applied through the supporting link members 14 and 15 can be stably transmitted to the vehicle body frame members 2 from both sides in the vehicle width direction. Deformation of the vehicle body frame members 2 in the vehicle width direction can therefore be prevented.

In the motorcycle 1, the front-rear coupling portion 2b lies outside the outer side surfaces of the crank case, the oil pan 5c, and the exhaust pipe 21 in the vehicle width direction. The front-rear coupling portion 2b lies above the location of the lower end of the engine 5, i.e., above the locations of lower portions of the oil pan 5c and exhaust pipe 21 which are components located below the crank case. Thus, the front-rear coupling portion 2b can easily be disposed to extend in the forward-rearward direction while the front-rear coupling portion 2b is prevented from being significantly curved in the upward-downward direction.

In the present embodiment, the front-rear coupling portion 2b lies outside the engine 5 in the vehicle width direction and is coupled to the side of the engine 5 in the vehicle width direction. This eliminates the need for an additional component for fixing the front-rear coupling portion 2b, thus preventing size increase of the vehicle body.

In the present embodiment, the vehicle body frame member 2 is coupled at its two portions, namely front and rear portions, to the engine 5. Thus, part of a load transmitted to the vehicle body frame member 2 and acting in the forward-rearward direction can be borne by the engine 5. This can prevent size increase of the vehicle body frame member 2, in particular of the front-rear coupling portion 2b.

In the present embodiment, peripheral components of the engine 5 are mounted to the vehicle body frame member 2 which can be standardized. Thus, when the shell shape, the seat location, or the type of the drive source is varied, the locations at which the peripheral components are fixed can be standardized, and the design change can be made easy.

The shell member may be supported by the handle supporting member 8 or the seat supporting member 9. This makes it easy to change the shell shape while standardizing the vehicle body frame member 2. When the shell member is supported by the vehicle body frame member 2, the riding posture can easily be changed by replacing the handle supporting member 8 and the seat supporting member 9 without varying the shell shape.

The handle supporting member 8 and the seat supporting member 9, which significantly influence the riding posture, are removable from the vehicle body frame member 2. This makes it easy to vary the riding posture depending on the preference of the rider or the intended use of the vehicle body. Additionally, when the left and right vehicle body frame members 2 are coupled to the engine 5 as in the present embodiment, size increase of each vehicle body frame member 2 can be prevented. The following will describe other embodiments with emphasis on differences from the first embodiment.

Second Embodiment

Figure 4:
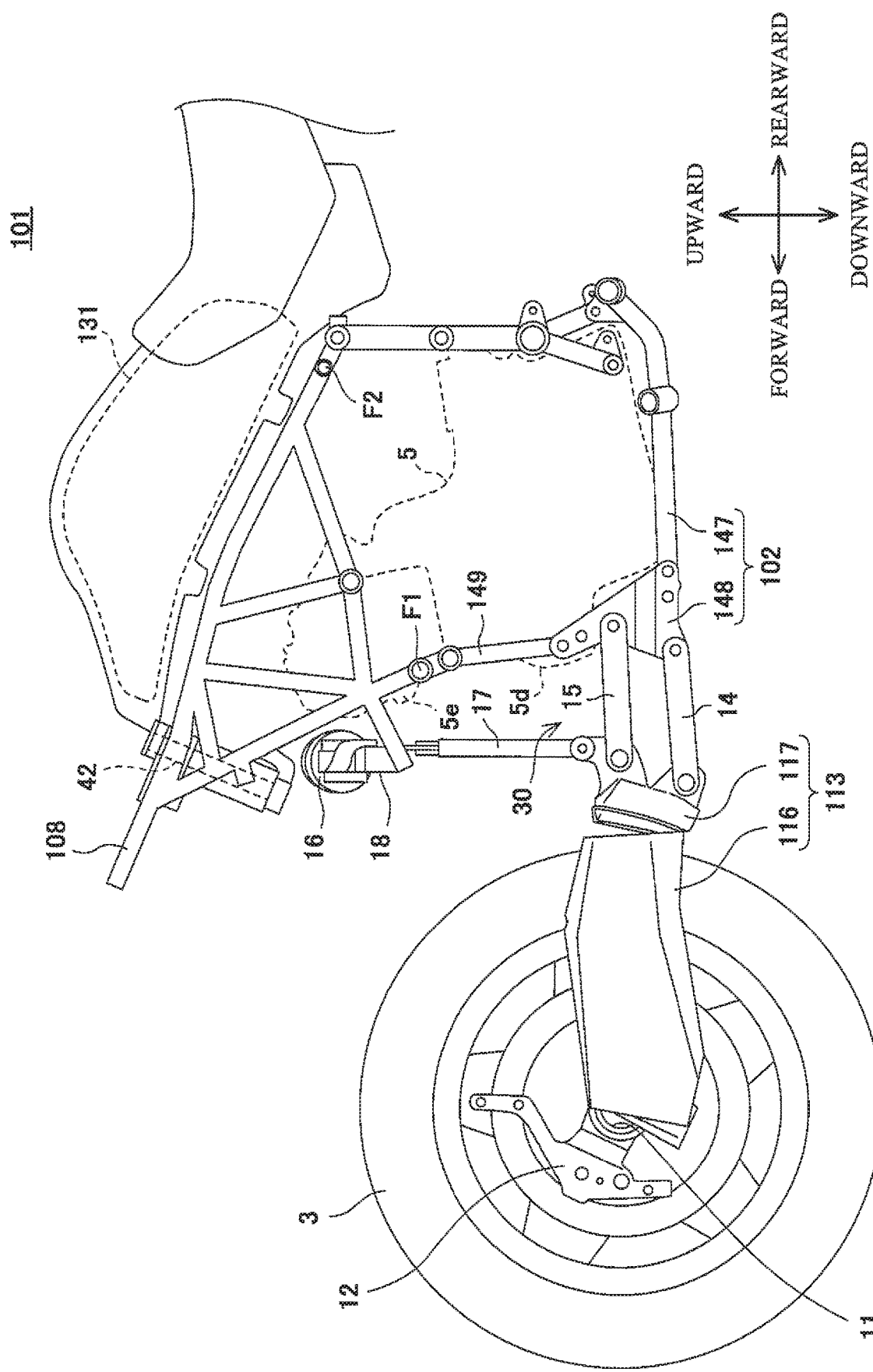
FIG. 4 is a left side view of major components of a motorcycle according to a second embodiment.

FIG. 4 is a left side view of major components of a motorcycle 101 according to a second embodiment. In FIG. 4, steering link members are omitted, and a rear portion of a support arm 113 and a region around the front axle 11 are shown in an exploded state. As shown in FIG. 4, the motorcycle 101 includes a vehicle body frame member 102 and a handle supporting member 108.

The handle supporting member 108 extends in the forward-rearward direction and supports at its front portion the steering stem 42 and a handle which is not shown. The handle supporting member 108 also supports a fuel tank 131 from which a fuel is supplied to the engine 5. In an example, the handle supporting member 108 is formed as a pipe frame composed of a plurality of pipe members joined by welding.

The vehicle body frame member 102 includes: a frame main portion 147 corresponding to the front-rear coupling portion; an attachment portion 148 provided separately from the frame main portion 147 and removably attached to the frame main portion 147; the rear wheel supporting portion 2a; and an extension portion 149. The attachment portion 148 corresponds to the front wheel supporting portion 2e.

The frame main portion 147 is formed in a shape extending in the forward-rearward direction and curved upwardly at its rear end. The attachment portion 148 is disposed forward of the frame main portion 147. In an example, the attachment portion 148 is formed to have a triangular shape with one vertex located above the other vertices in side view. The paired supporting link members 14 and 15 in each of the link mechanisms 30 provided on the opposite sides in the vehicle width direction are connected to the vehicle body frame member 102 at the attachment portion 148. That is, the paired supporting link members 14 and 15 are not attached to any portion of the vehicle body frame member 102 other than the attachment portion 148.

The extension portion 149 extends in the upward-downward direction above the attachment portion 148 and has a lower end removably coupled to the attachment portion 148 by a fastening member and an upper end coupled to the handle supporting member 108. That is, in the motorcycle 101, the handle supporting member 108 is directly and removably coupled to the vehicle body frame member 102. The vehicle body frame member 102 is removably coupled to the engine 5 by a fastening member so as to support the weight of the engine 5 from below.

In the motorcycle 101, the handle supporting member 108 is removably coupled to the vehicle body frame member 102 by fastening members at a front coupling point F1 set on a front portion of the vehicle body frame member 102 and a rear coupling point F2 set on a rear portion of the vehicle body frame member 102. The front coupling point F1 of the vehicle body frame member 102 is located forward of the engine 5 and is set on a frame portion extending upward from the attachment portion 148. The rear coupling point F2 of the vehicle body frame member 102 is located rearward of the engine 5 and is set on a frame portion extending upward from the rear wheel supporting portion 2a.

In the present embodiment, these coupling points F1 and F2 are located above the lower end of the cylinder block 5e. Fixation portions to be fixed to the engine 5 are provided in the vehicle body frame member 102, and the fixation portions are fixed at locations which are in the vicinity of, or coincide with, the front coupling point F1 and rear coupling point F2.

The support arm 113 is formed of two portions which are originally separated in the forward-rearward direction, and the two portions are joined by welding. Specifically, for the support arm 113, a rear end portion 117 to which the supporting link members 14 and 15 are coupled is formed as a member separate from the rest of the support arm.

The motorcycle 101 configured as described above provides the same effect as the motorcycle of the first embodiment. Since the handle supporting member 108 and the vehicle body frame member 102 are coupled by fastening members at locations lateral to the engine 5, the coupling between the handle supporting member 108 and the vehicle body frame member 102 can be efficiently accomplished by applying the fastening members from the side of the engine 5 in manufacturing of the motorcycle.

Additionally, since the handle supporting member 108 and the vehicle body frame member 102 are coupled to each other at locations above the lower end of the cylinder block 5e, the engine 5 can easily be protected from the outside environment by the vehicle body frame member 102. Further, the lateral overlap between the handle supporting member 108 and the engine 5 can be reduced. Thus, in manufacturing of the motorcycle, it is easily possible to couple the handle supporting member 108 and the vehicle body frame member 102 together while preventing interference between the handle supporting member 108 and the engine 5.

A plurality of types of attachment portions 148 may be prepared. In this case, for example, the arrangement of the support arm 113 relative to the vehicle body frame member 102 can be varied by changing the attachment portion 148 to be used from one type to another while using the same frame main portion 147 and supporting link members 14 and 15. This makes it possible to vary the vehicle body behavior or the vehicle height by changing the vertical location or the orientation of the front end of the support arm 113 relative to the vehicle body frame member 102.

Likewise, a plurality of types of rear end portions 117 may be prepared. In this case, for example, the arrangement of the support arm 113 relative to the vehicle body frame member 102 can be varied by changing the rear end portion 117 to be used in formation of the support arm 113 from one type to another while using the same arm main portion 116 and supporting link members 14 and 15, just as the relative arrangement of the support arm 113 can be varied by changing the attachment portion 148 from one type to another. Although in the present embodiment the rear end portion 117 is joined to the rest of the support arm by welding, the rear end portion 117 may be removably connected to the rest of the support arm by means such as a fastening member.

Thus, the present invention encompasses a configuration in which the rear portion of the handle supporting member extends rearward beyond the engine. The present invention also encompasses a configuration in which the vehicle body frame member is constituted by a plurality of frame members connected together. The present invention further encompasses a configuration in which the vehicle body frame member is constituted by a plate material and a configuration in which the vehicle body frame member is constituted by a plurality of pipe members joined by welding.

Further, in the present embodiment, the front and rear of the upper portion of the vehicle body frame member 102 can be coupled by the handle supporting member 108. This can further reduce the deformation of the vehicle body frame member 102.

Third Embodiment

Figure 5:
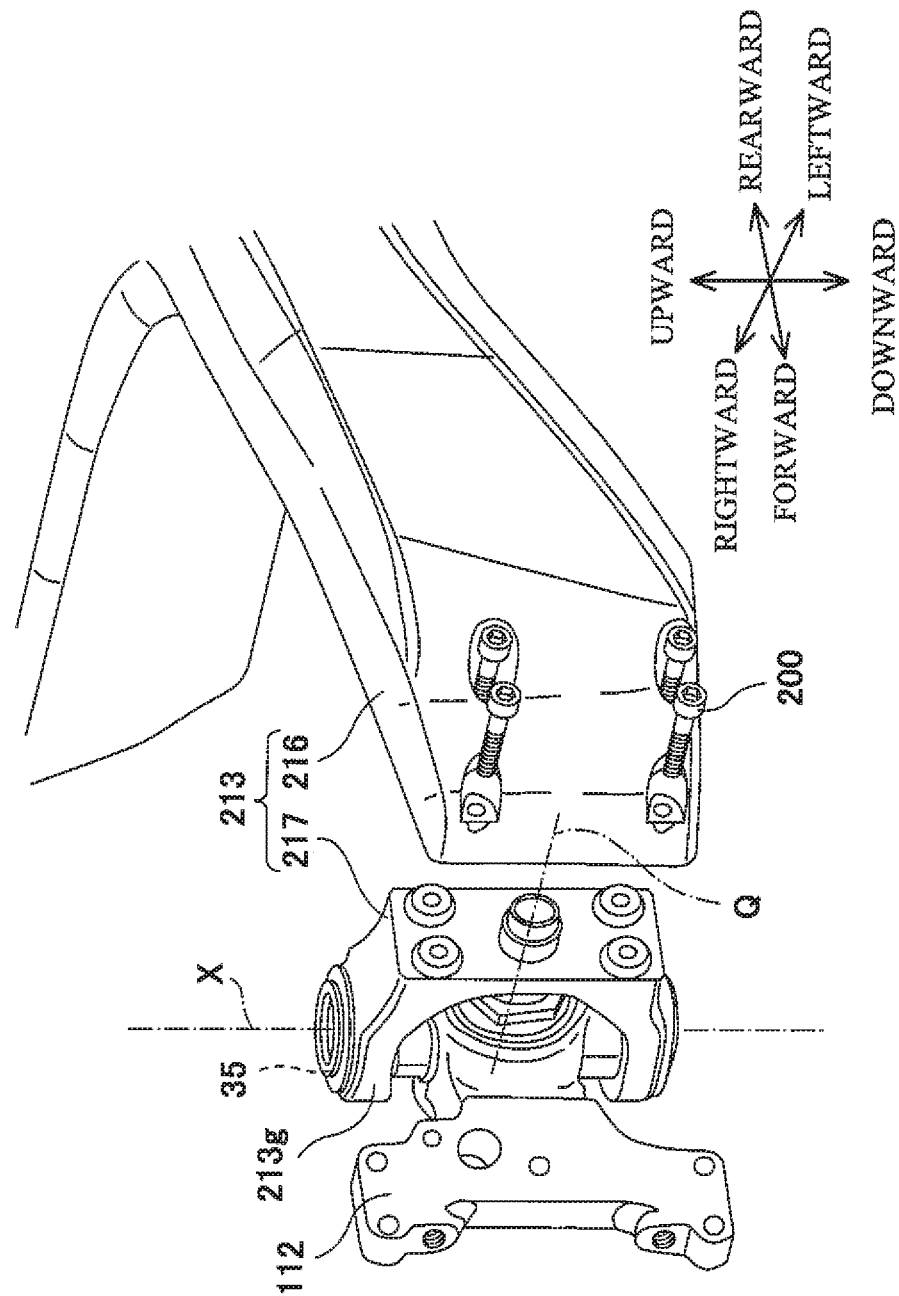
FIG. 5 is an exploded view of a support arm according to a third embodiment.

FIG. 5 is an exploded view of a support arm 213 according to a third embodiment. As shown in FIG. 5, the support arm 213 includes an arm main portion 216 extending in the forward-rearward direction and a holding portion 217 holding a knuckle member 112, the holding portion 217 being provided separately from the arm main portion 216 and being removably attached to the arm main portion 216. The holding portion 217 is provided with a rotatably supporting portion 213g corresponding to the rotatably supporting portion 13g of the support arm 13. The holding portion 217 is removably coupled to the front portion of the arm main portion 216 by a plurality of fastening members 200.

With the above configuration, for example, the arrangement of the steering axis X relative to the vehicle body frame member can be varied by preparing a plurality of types of holding portions 217 and by changing the holding portion 217 to be used from one type to another while using the same frame main portion and link members. This makes it possible to vary the amount of the offset of the steering axis X with respect to the location of the front wheel 3 or vary the caster angle of the front wheel 3, thus varying the motion characteristics of the vehicle body.

The present invention is not limited to the above embodiments, and any element may be modified, added, or eliminated without departing from the gist of the present invention. The steered wheel is not limited to the front wheel. The straddle vehicle may be a three-wheeled automobile or a four-wheeled automobile. The drive source may be an electric motor for vehicle travel rather than an engine. The drive source may include both an engine for vehicle travel and an electric motor for vehicle travel.

The support arm may be disposed on each of the opposite sides of the vehicle body in the vehicle width direction. That is, the front wheel supporting structure may have a configuration in which the support arms support the knuckle member from both sides in the vehicle width direction. The drive source for vehicle travel may be used also as a rigid member forming a part of the vehicle body frame.

The front suspension may, like the rear suspension, be disposed along a plane perpendicular to the vehicle width direction. In this case, a force applied to the front suspension can be borne by the vehicle body frame member. Thus, even when the handle supporting member is formed in a frame shape as in the second embodiment, a force transmitted from the front suspension to the vehicle body frame member is prevented from being transmitted to the handle supporting member. This eliminates the need for configuring the handle supporting member to have high rigidity, leading to an increase in the flexibility in designing the handle supporting member. In order to ensure the flexibility in designing the handle supporting member, it is preferable that the suspension be connected to the vehicle body frame member rather than to the handle supporting member.

The handle may be non-rotatable and, for example, the steered wheel may be steered by means of a switch provided on the grip of the handle. The way in which the steering mechanism performs steering may be chosen as appropriate. In the first embodiment, an example is described in which the steering mechanism 22 steers the front wheel 3 by means of the steering member 40, the link unit 41, and the steering stem 42. The steering mechanism may be configured to steer the front wheel by means of an actuator. The paired supporting link members 14 and 15 are not essential and may be eliminated.

In the above embodiments, a configuration is described in which the swing arm is supported by the rear wheel supporting portion of the vehicle body frame member of the motorcycle. However, the present invention is not limited to this configuration. For example, the straddle vehicle may include an auxiliary supporting member coupled to the rear portion of the engine and having a plate shape extending perpendicular to the forward-rearward direction. In this case, the swing arm and the rear suspension are connected to the auxiliary supporting member.

The rear wheel supporting portion of the vehicle body frame member may be coupled to the auxiliary supporting member and connected to the swing arm and the rear suspension via the auxiliary supporting member. In this case, the rear wheel supporting portion bears a force applied from the rear wheel via the auxiliary supporting member, and thus a load applied to the vehicle body frame member is prevented from concentrating at a point where a plurality of members are connected. Additionally, since the auxiliary supporting member is provided separately from the vehicle body frame member, it is easily possible to change the location of the swinging axis of the swing arm or the location at which the rear suspension is mounted while standardizing the vehicle body frame member.

Additionally, the attachment of the auxiliary supporting member to the engine enables transmission of a load from the rear wheel to the vehicle body frame member via the engine. This further ensures prevention of concentration of a load at a particular point on the vehicle body frame member, thus offering increased flexibility in designing the vehicle body frame member. In the auxiliary supporting member there may be provided a supporting portion supporting the engine.

In the above embodiments, a configuration is described in which the support arm is connected to the vehicle body frame member via the supporting link members. However, the present invention encompasses a configuration in which the arm rear portion is directly and swingably connected to the vehicle body frame member without the use of any supporting link members. This configuration can also provide the effect of enabling standardization of the vehicle body frame member.

The supporting link members included in the straddle vehicle may not be provided on the left and right sides in pair. The vehicle body frame member may be structured to have left and right portions coupled by the front wheel supporting portion. It is sufficient that the connection between the support arm 13 and the vehicle body be made with a space therebetween. For example, the support arm 13 and the vehicle body may be coupled at two upper and lower locations lying in an inner region in the vehicle width direction. The supporting link members may be eliminated. In this case, the support arm 13 and the vehicle body may be directly connected.

When the vehicle body frame member is disposed on each of the opposite sides in the vehicle width direction, the two vehicle body frame members may be coupled in the vehicle width direction by at least one rod member disposed in the vicinity of the supporting link members. In this case, a plurality of rod members extending in the vehicle width direction may be disposed forward of the engine and arranged in the upward-downward direction. Interference between the rod members and the engine can be successfully prevented by disposing the front wheel supporting portion forward of the engine.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A straddle vehicle comprising:
   a vehicle body frame member;
   a front wheel;
   a rear wheel;
   a rotatably supporting member supporting the front wheel in such a manner that the front wheel is rotatable about a front wheel axis thereof;
   a support arm supporting the rotatably supporting member in such a manner that the rotatably supporting member is angularly movable about a steering axis extending in an upward-downward direction, the support arm extending rearward from the rotatably supporting member;
   a pair of upper and lower link members pivotally connected to the support arm at two locations on a rear portion of the support arm, the two locations being spaced in the upward-downward direction, the pair of upper and lower link members extending rearward from the support arm, each of the link members having a rear portion pivotally connected to the vehicle body frame member;
   a handle to be held by a rider assuming a riding posture;
   a handle supporting member removably coupled to the vehicle body frame member and supporting the handle; and
   a drive source disposed between the front wheel and the rear wheel and configured to generate a drive power for travel of the vehicle, wherein
   the vehicle body frame member comprises: a rear wheel supporting portion supporting the rear wheel; a front wheel supporting portion connected to the pair of link members; and a front-rear coupling portion disposed separately from the drive source, the front-rear coupling portion extending in a forward-rearward direction from the front wheel supporting portion and being continuous with the rear wheel supporting portion.

2. The straddle vehicle according to claim 1, wherein
   the front wheel supporting portion and the front-rear coupling portion are disposed in a region below a center of the drive source in the upward-downward direction, and
   in the region below the center of the drive source in the upward-downward direction, the front-rear coupling portion extends in the forward-rearward direction from the front wheel supporting portion to the rear wheel supporting portion.

3. The straddle vehicle according to claim 2, wherein the front-rear coupling portion extends rearward through a region lying between respective rear ends of the paired link members in the upward-downward direction.

4. The straddle vehicle according to claim 1, wherein the front wheel supporting portion has a base portion whose dimension in the upward-downward direction decreases from front to rear.

5. The straddle vehicle according to claim 1, wherein
   the pair of link members and the front-rear coupling portion are disposed on each of opposite sides of the vehicle body in a vehicle width direction,
   the front-rear coupling portions disposed on the opposite sides of the vehicle body in the vehicle width direction are inclined inwardly in the vehicle width direction in such a manner that a distance between the front-rear coupling portions in the vehicle width direction decreases from front to rear, and
   the front-rear coupling portions are coupled in the vehicle width direction at rear portions thereof.

6. The straddle vehicle according to claim 1, wherein the front-rear coupling portion extends in the forward-rearward direction through a region outward of the drive source in the vehicle width direction, the region being inward of an outermost side surface of the drive source in the vehicle width direction.

7. A straddle vehicle comprising:
   a vehicle body frame member;
   a front wheel;
   a rotatably supporting member supporting the front wheel in such a manner that the front wheel is rotatable about a front wheel axis thereof;
   a support arm supporting the rotatably supporting member in such a manner that the rotatably supporting member is angularly movable about a steering axis extending in an upward-downward direction, the support arm extending rearward from the rotatably supporting member;

a pair of upper and lower link members pivotally connected to the support arm at two locations on a rear portion of the support arm, the two locations being spaced in the upward-downward direction, the pair of upper and lower link members extending rearward from the support arm, each of the link members having a rear portion pivotally connected to the vehicle body frame member;

a handle to be held by a rider assuming a riding posture; and a handle supporting member removably coupled to the vehicle body frame member and supporting the handle, wherein the support arm comprises an arm main portion extending in a forward-rearward direction and a holding portion holding the rotatably supporting member, the holding portion being provided separately from the arm main portion and being removably attached to the arm main portion.

8. A straddle vehicle comprising:
a vehicle body frame member;
a front wheel;
a rotatably supporting member supporting the front wheel in such a manner that the front wheel is rotatable about a front wheel axis thereof;
a support arm supporting the rotatably supporting member in such a manner that the rotatably supporting member is angularly movable about a steering axis extending in an upward-downward direction, the support arm extending rearward from the rotatably supporting member;
a pair of upper and lower link members pivotally connected to the support arm at two locations on a rear portion of the support arm, the two locations being spaced in the upward-downward direction, the pair of upper and lower link members extending rearward from the support arm, each of the link members having a rear portion pivotally connected to the vehicle body frame member;
a handle to be held by a rider assuming a riding posture; and
a handle supporting member removably coupled to the vehicle body frame member and supporting the handle, wherein the vehicle body frame member comprises a frame main portion and an attachment portion provided separately from the frame main portion and removably attached to the frame main portion, and the pair of link members is connected to the attachment portion.

9. A straddle vehicle comprising:
a vehicle body frame member;
a front wheel;
a rear wheel;
a rotatably supporting member supporting the front wheel in such a manner that the front wheel is rotatable about a front wheel axis thereof;
a support arm supporting the rotatably supporting member in such a manner that the rotatably supporting member is angularly movable about a steering axis extending in an upward-downward direction, the support arm extending rearward from the rotatably supporting member;
a handle to be held by a rider assuming a riding posture;
a handle supporting member removably coupled to the vehicle body frame member and supporting the handle; and
a drive source disposed between the front wheel and the rear wheel and configured to generate a drive power for travel of the vehicle, wherein the vehicle body frame member comprises: a rear wheel supporting portion supporting the rear wheel; a connection portion connected directly or indirectly to the support arm; and a front-rear coupling portion disposed separately from the drive source, the front-rear coupling portion extending in a forward-rearward direction from the connection portion and being continuous with the rear wheel supporting portion, the connection portion and the front-rear coupling portion are disposed in a region below a center of the drive source in the upward-downward direction, and in the region below the center of the drive source in the upward-downward direction, the front-rear coupling portion extends in the forward-rearward direction from the connection portion to the rear wheel supporting portion.

* * * * *

UNITED STATES PATENT AND TRADEMARK OFFICE
CERTIFICATE OF CORRECTION

| | | |
|---|---|---|
| PATENT NO. | : 11,225,300 B2 | Page 1 of 1 |
| APPLICATION NO. | : 16/517864 | |
| DATED | : January 18, 2022 | |
| INVENTOR(S) | : Kogirima et al. | |

It is certified that error appears in the above-identified patent and that said Letters Patent is hereby corrected as shown below:

On the Title Page

Item (72), Line 3, delete "Faro Iwamoto" and insert --Taro Iwamoto--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*